United States Patent
Namuduri

(10) Patent No.: US 7,232,016 B2
(45) Date of Patent: Jun. 19, 2007

(54) FLUID DAMPER HAVING CONTINUOUSLY VARIABLE DAMPING RESPONSE

(75) Inventor: Chandra Sekhar Namuduri, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/730,440

(22) Filed: Dec. 8, 2003

(65) Prior Publication Data

US 2005/0121269 A1    Jun. 9, 2005

(51) Int. Cl.
F16F 9/53 (2006.01)
F16F 9/52 (2006.01)

(52) U.S. Cl. .................. 188/267.2; 188/276; 188/267.1

(58) Field of Classification Search ................ 188/266, 188/267, 267.1, 267.2, 276; 251/48
See application file for complete search history.

(56) References Cited

U.S. PATENT DOCUMENTS

| | | | | |
|---|---|---|---|---|
| 4,815,575 A | | 3/1989 | Murty | ......................... 188/299 |
| 4,946,131 A | * | 8/1990 | Weyand | ......................... 251/48 |
| 5,233,834 A | * | 8/1993 | Tsukamoto | ........................ 60/545 |
| 5,277,281 A | | 1/1994 | Carlson et al. | ............. 188/267 |
| 5,667,715 A | | 9/1997 | Foister | |
| 5,878,997 A | * | 3/1999 | Miesner | ................ 267/140.14 |
| 5,992,582 A | | 11/1999 | Lou et al. | |
| 6,390,252 B1 | * | 5/2002 | Namuduri et al. | ........ 188/267.2 |
| 6,637,558 B2 | | 10/2003 | Oliver | ...................... 188/267.2 |
| 6,740,125 B2 | * | 5/2004 | Mosler | ......................... 623/45 |
| 2001/0054527 A1 | | 12/2001 | Card | |
| 2003/0030523 A1 | * | 2/2003 | Bell et al. | ................... 335/220 |
| 2003/0127293 A1 | * | 7/2003 | Rosenfeldt et al. | ...... 188/267.1 |

FOREIGN PATENT DOCUMENTS

| | | |
|---|---|---|
| DE | 3535704 A1 | 4/1987 |
| DE | 19963580 C2 | 8/2001 |
| DE | 10352176 A1 | 6/2005 |
| JP | 09264492 A | 10/1997 |

\* cited by examiner

Primary Examiner—Melody M. Burch
(74) Attorney, Agent, or Firm—Kathryn A. Marra

(57) ABSTRACT

An improved damping apparatus that utilizes a fluid having a viscosity that may be varied by the application of an electromagnetic field, such as a magnetorheological fluid or an electrorheological fluid, to provide the damping response. The damping apparatus includes a linear to rotary conversion mechanism which comprises a translatable member that is adapted for linear translation in a forward and a reverse direction and a rotatable member comprising a rotatable shaft that is rotatably coupled to the translatable member; wherein translation of the translatable member in one of the forward or the reverse directions produces a forward or a reverse rotation of the rotatable member and shaft, respectively. The damping apparatus also includes a damping mechanism which comprises a hub that is fixed to the shaft, a means for generating a variable electromagnetic field in response to an applied electrical signal that may be continuously varied in response to an input signal that is representative of a desired damping force and a fluid having a viscosity that may be continuously varied by application of the electromagnetic field that is in touching contact with the hub. Application of the variable electromagnetic field to the fluid produces changes in the viscosity of the fluid that in turn provides variable resistance to rotation of the hub and resistance to translation of the translatable member, thereby providing a damping apparatus with a continuously variable damping response.

6 Claims, 5 Drawing Sheets

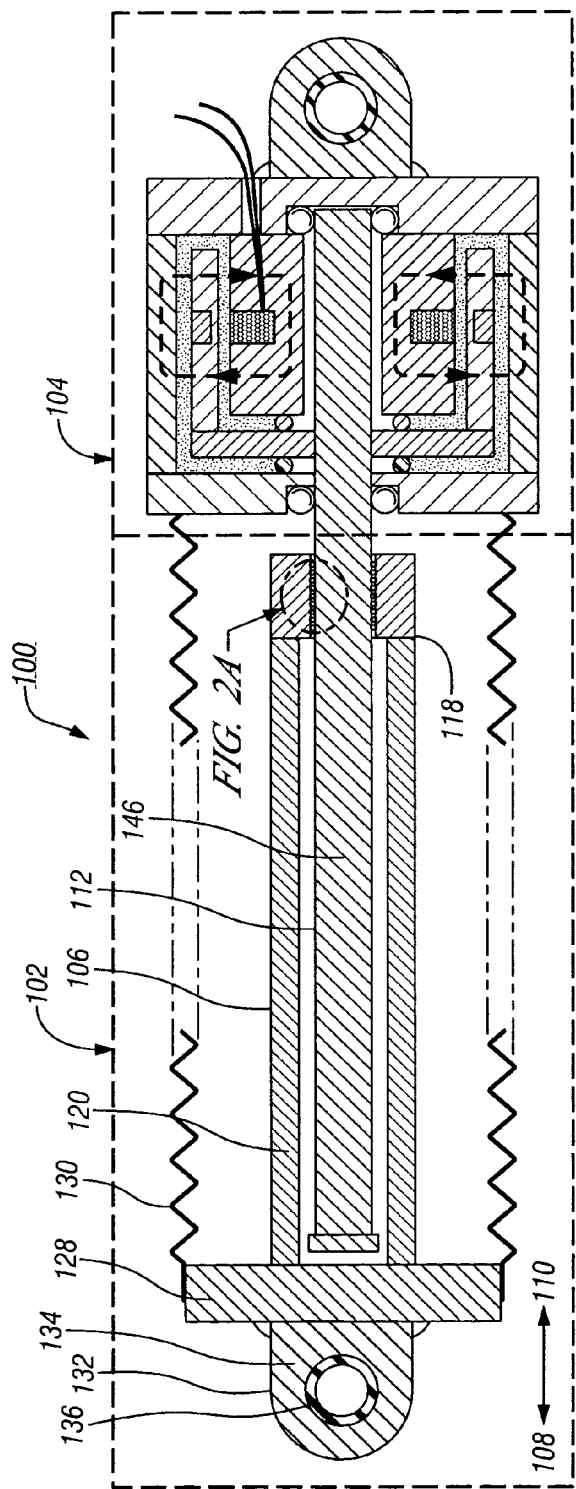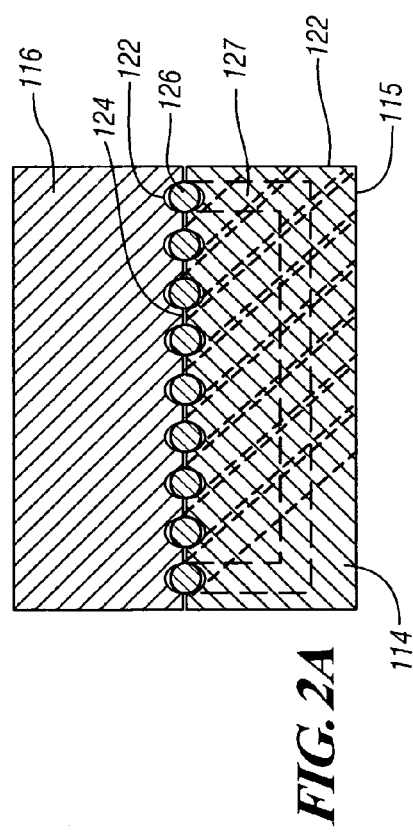
*FIG. 2*
*FIG. 2A*

FLUID DAMPER HAVING CONTINUOUSLY VARIABLE DAMPING RESPONSE

TECHNICAL FIELD

The present invention relates generally to damping devices used in controlled damping applications, such as semi-active vehicle suspension systems. More particularly, the present invention relates to high performance, continuously variable, real time damping devices using magnetorheological (MR) or electrorheological (ER) fluids.

BACKGROUND OF THE INVENTION

Most vehicle suspension systems utilize damping devices or shock absorbers for controlling the vibrations of the body and wheel due to road disturbances imposed on the mass-spring system of the vehicle body/wheel and suspension springs. A vehicle suspension damper usually provides a resistive force proportional to the relative velocity between the body and the wheel. High performance controlled damping applications, such as those used in passenger vehicle suspension systems, preferably provide a relatively low damping force at low speeds for comfort, and provide a relatively high damping force at high speeds for safe handling of the vehicle. It is known that such response characteristics can be provided by semi-active or active suspension systems, wherein the damping response of the systems can be continuously varied in real time in response to the dynamic conditions experienced by the vehicle using continuously variable—real-time damping (CV-RTD) actuators.

The use of CV-RTD actuators using "smart fluids" (e.g., electrorheological (ER) and magnetorheological (MR) fluids) with continuously variable and controllable rheology and a fixed flow portion instead of moving mechanical valves with a variable flow portion have been proposed. The use of ER fluids requires relatively large electrical fields (on the order of 5 kV/mm to produce the desired range of rheological effects, whereas MR fluids produce similar Theological effects at voltages well below 12V and hence have generally been preferred for many applications, including use in automotive vehicles.

Magnetorheological (MR) fluids consist of magnetizable particles (e.g., iron and/or iron alloy powders) suspended in an inert base fluid (e.g., synthetic oil). MR fluids typically exhibit Newtonian flow characteristics, with negligible yield stress when there is no external magnetic field. However, the yield stress of a MR fluid can be increased by several orders of magnitude by subjecting it to a magnetic field perpendicular to the flow direction of the fluid. This Bingham plastic behavior of MR fluid in the "on" state is advantageous in creating actuators with controllable force or torque characteristics such as vibration dampers and clutches, without using any moving valves. MR fluids, and devices using the MR fluids, are well known. However, earlier problems with sedimentation and abrasion discouraged their use. Recent advances in material technology and electronics have renewed the interest in MR fluids for applications in smart actuators for fast and efficient control of force or torque (e.g., damping) in a mechanical system.

Other examples of CV-RTD dampers are described and illustrated in U.S. Pat. Nos. 5,277,281 and 6,390,252 and generally comprise monotube MR dampers 10 having a piston 20 sliding within a hollow tube 30 that is filled with MR fluid 40, as illustrated in FIG. 1.

While MR fluid dampers of the types generally described above have been successfully used in CV-RTD applications and have demonstrated the ability to provide fast and continuous variable control of damping forces, they require that the hollow tube be substantially filled with MR fluid which is a relatively expensive material. Typically vehicles equipped with MR fluid shock absorbers use on the order of 1 liter or more per vehicle. Furthermore, the fluids may require special handling and disposal at the end of the useful service life of the vehicle. These devices typically require a special finish on the rod and the inner surface of the tube, and special high pressure seals for the floating gas piston and the rod to minimize abrasion associated with the MR fluid and provide the necessary sealing at the operating fluid pressures of the device. Also, the packaging of the piston with an appropriate coil can be difficult when high turn-up ratios at high velocities are desired due to the relatively large size of the coil required to provide these ratios.

It is therefore desirable to develop damper designs that utilize MR fluid to control damping forces, but which also eliminate or reduce some of the requirements associated with the prior damper designs, such as the volume of MR fluid required, the need for special component finishes, the need for a gas reservoir to accommodate the MR fluid displaced during the actuation of the damper, or the need for coil designs that are difficult to package in the envelope allowed for the dampers.

SUMMARY OF THE INVENTION

The present invention comprises a linear to rotary conversion mechanism that is operatively coupled to a damping mechanism that employs a coaxial rotary configuration for generating a resistance or damping force, rather than prior piston-based configurations.

The linear to rotary conversion mechanism comprises a translatable member, such as a ball nut, that is adapted for linear translation in a forward and a reverse direction and a rotatable member, such as a ball screw, comprising a rotatable shaft that is rotatably coupled to the translatable member; wherein translation of the translatable member in one of the forward or the reverse directions produces a forward or a reverse rotation of the rotatable member and shaft, respectively.

The damping mechanism comprises a hub that is fixed to the shaft, a means for generating a variable electromagnetic field in response to an applied electrical signal that may be continuously varied in response to an input signal that is representative of a desired damping force, and a fluid, such as an MR fluid, having a viscosity that may be continuously varied by application of the electromagnetic field that is in touching contact with the hub. The damping mechanism preferably includes a damper housing that houses the elements described and incorporates a channel to retain the fluid.

Application of the variable electromagnetic field to the fluid produces changes in the viscosity of the fluid that in turn provides variable resistance to rotation of the hub and variable resistance to translation of the translatable member, thereby providing a damping apparatus having a continuously variable damping response.

One advantage of this invention compared with existing MR fluid based dampers, such as piston-based MR dampers, is believed to be lower manufacturing cost due to a reduced volume of MR fluid. A second advantage is believed to be that the apparatus of the present invention requires a smaller packaging envelope as compared to prior piston-based MR fluid dampers related to both the reduced volume of MR fluid required for its operation and the elimination of the need for a gas reservoir to accommodate fluid displacement as the damper is actuated. A third advantage is believed to be a reduction in the surface area of components in the damper mechanism that require anti-wear coatings due to the abrasive nature of the MR fluids. A fourth advantage is believed to be the ability to utilize relatively lower pressure and hence lower cost seals to seal the MR fluid due to the lower fluid operating pressures utilized in the present invention. A fifth advantage is believed to be the ability of the present invention to improve the linearity of the force-velocity characteristics of the actuator due to the absence of second order entry and exit effects of MR fluid flow found in prior art piston-based monotube devices. A final advantage is believed to be that the present invention may provide higher turn-up ratios in smaller packages as compared to prior piston-based MR fluid dampers.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 2 is a schematic cross-sectional illustration of an MR fluid damper of the present invention;

FIG. 2A is an enlarged schematic cross-sectional illustration of Sectional Area A of FIG. 2;

DESCRIPTION OF THE PREFERRED EMBODIMENT

Figure 1:
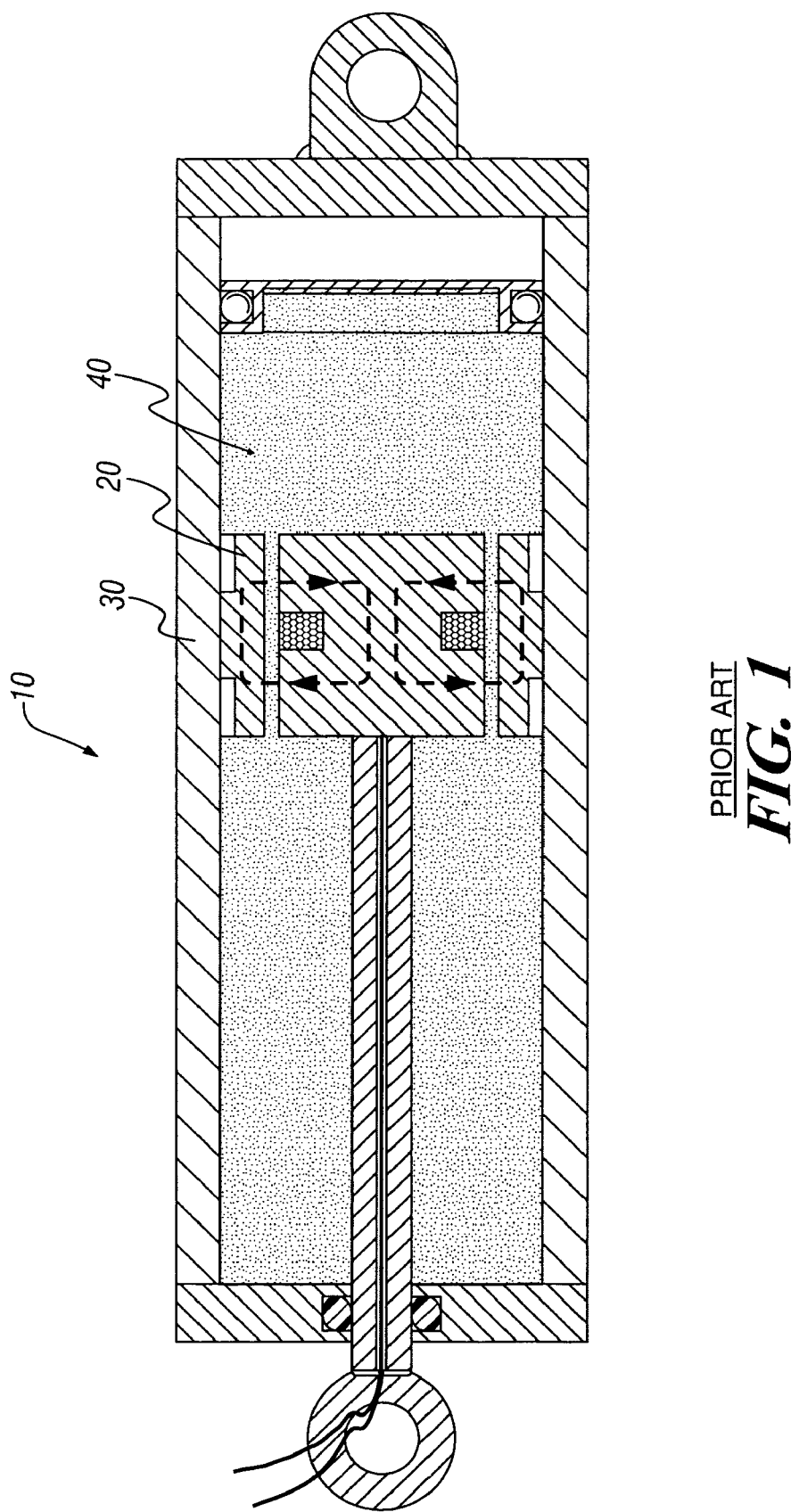
FIG. 1 is a schematic cross-sectional illustration of a prior art MR fluid damper.

Referring to FIGS. 2–8, this invention may be described generally as a damping apparatus 100 which includes linear to rotary conversion mechanism 102 for converting linear motion and forces applied to damping apparatus to rotary movement and forces which may be damped by operation of damping mechanism 104. In a vehicular application, damping apparatus 100 may be incorporated into the suspension system as a shock absorber in the spring mass system comprising the vehicle chassis and other sprung masses and the wheels and other unsprung masses. In such systems, the linear motion and force inputs occur as the vehicle is driven and the wheel experiences movement relative to the chassis, such as, for example, those caused by variations in the surface that the vehicle is driven on or objects in the path of the wheel.

Linear to rotary conversion mechanism 102 comprises translatable member 106, that is adapted for linear translation in a forward direction 108 and a reverse direction 110, and rotatable member 112 comprising a rotatable shaft 114 that is rotatably coupled to translatable member 106 through coupling 115, such that translation of translatable member 106 in one of the forward 108 or the reverse 110 directions produces a forward or a reverse rotation of rotatable member 112 and shaft 114, respectively. Linear translation is intended to also encompass linear to rotary conversion mechanisms 102 wherein the translatable member 106 provides linear or curvilinear translation. In addition to movement, these members also generally transmit linear and rotational forces associated with their movement. Further, while the description above assume the motion of these members during the operation of damping apparatus, it should be noted that damping mechanism may also be operated so as to substantially resist or prevent the motion of these members, such that they transmit linear and rotational forces without any associated movement.

As shown in FIGS. 2–5, translatable member 106 may comprise ball nut 116 that is fixed to end 118 of ball nut housing 120. Ball nut 116 may be fixed to end 118 in any manner that is sufficient to transmit the maximum axial loads and torques that are to be experienced by damping apparatus, and will depend upon the materials employed for ball nut 116 and ball nut housing 120, such as welding, brazing, interference fit/staking or other known methods of fixing these devices to one another. Referring to FIG. 2A, ball nut 116 is of known construction and preferably incorporates a plurality of curved grooves, such as helical grooves 122, in the surface of cylindrical bore 124. Helical grooves 122 are preferably adapted to receive a plurality of recirculatable balls 126 in any of a number of known ball recirculation means 127. Ball recirculation means may be located either inside of, outside of, or partially inside and outside of ball nut 116. Recirculatable balls 126 that are located between rotatable member 114 and ball nut 116 are adapted to transfer the axial load and torque between the translatable member and rotatable member, as described further below, and may be made from any suitable material, such as, for example, hardenable steels of the types used to make various types of bearings.

Ball nut housing 120 may comprise any suitable shape, but is preferably a hollow cylinder and may be made from any material that is capable of transmitting the axial loads and torques that result as damping apparatus 100 is operated in its intended application, such as structural metals (e.g., iron, steel, aluminum, titanium or other structural alloys) or structural composites ( e.g., fiber reinforced engineering plastics). Ball nut housing 120 may also incorporate a means for attachment, such as flange 128, of a cover, such as elastomeric boot 130 or other suitable means for protecting and sealing translatable member 106 and rotatable member 112 from an external environment. Cover may also comprise a telescoping metal, plastic or other cover (not shown) as is commonly utilized to cover shock absorbers. Flange 128 may be formed integrally with or from ball nut housing 120, or may be formed separately and fixed to ball nut housing 120. Elastomeric boot 130 may comprise rubber, nitrile or other suitable elastomeric materials. Ball nut housing 120 also preferably comprises attachment point 132, such as flange 134 and elastomeric bushing 136 or alternately a threaded end (not shown) for fixing damping apparatus 100 to one of the items which is to be damped, such as, in the case of a vehicle, the vehicle chassis or other "sprung" masses or the axle, wheel or other unsprung masses.

Figure 6:
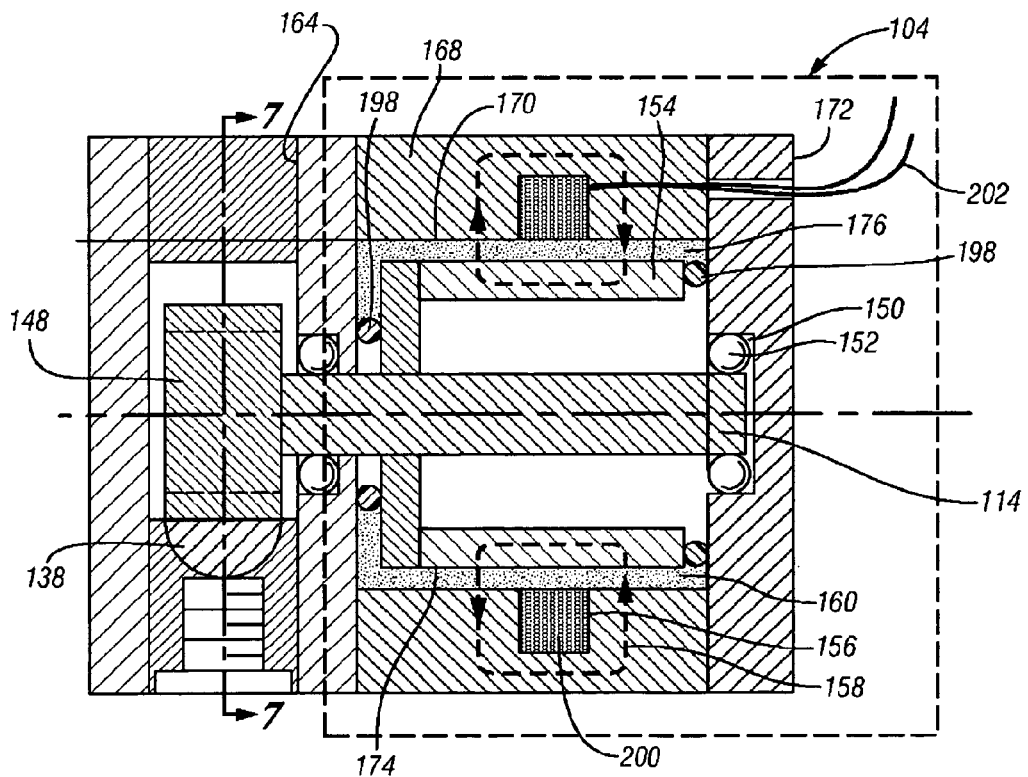
FIG. 6 is a schematic cross-sectional illustration of another embodiment of an MR fluid damper of the present invention.
Figure 7:
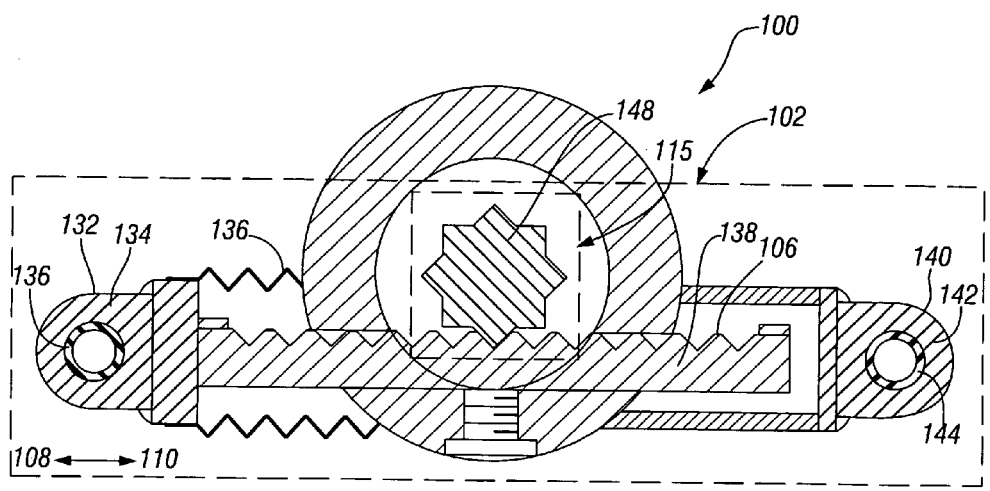
FIG. 7 is a schematic cross-sectional illustration of the MR fluid damper of FIG. 6 taken along Section 7—7.
Figure 8:
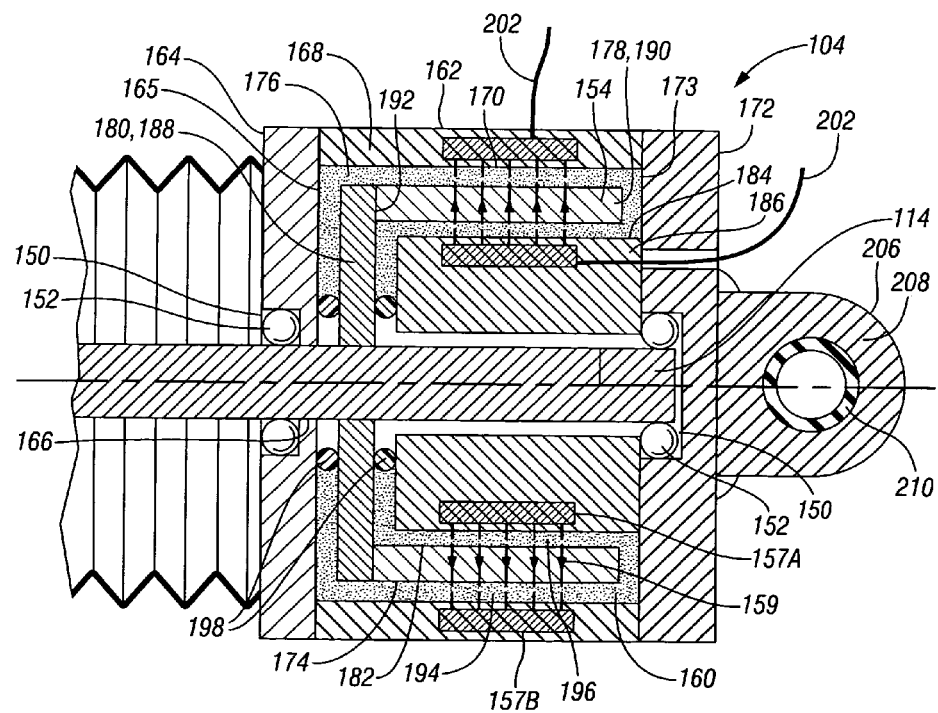
FIG. 8 is an enlarged schematic cross-sectional illustration of the damping mechanism of FIG. 2 modified to exemplify adaptation to electrorheological fluids.

Referring to FIGS. 6–7, translatable member 106 may also comprise a translatable toothed gear rack 138. Rack 138 may be of any suitable combination of rack tooth, cross-sectional and longitudinal configuration. For example, the cross-sectional and longitudinal configurations may comprise any of a number of known configurations, including circular, semi-circular, wedge-shaped or other cross-sectional configurations, and straight, arced, curved or other longitudinal configurations. Rack 138 may also comprise attachment point 140, such as flange 142 and elastomeric bushing 144 or a threaded end (not shown) for fixing damping apparatus 100 to the item which is to be damped, as described above.

Referring to FIGS. 2–5, rotatable member 112 comprises ball screw portion 146 over which ball nut 116 may be translated and shaft 114 which extends into damping mechanism. It is preferred that ball screw portion 146 and shaft 114 be formed from a single material, such as a structural metal (e.g., cast iron, steel, aluminum, titanium or other structural metal alloys), but they may be may made separately and joined to one another. Ball nut 116 and ball screw 146 serve as coupling 115 to couple the linear motion of translatable member 106 and rotational motion of rotatable member 112. Referring to FIG. 6, rotatable member 112 may also comprise pinion gear 148 and shaft 114. Toothed gear rack 138 and pinion gear 148 serve as coupling 115 to couple the linear motion of translatable member 106 and rotational motion of rotatable member 112. It is preferred that rotatable member 112 be rotatably supported with respect to damping mechanism 104 through shaft 114 by at least one means for providing rotatable support 150, such as a bearing or bushing 152. In the embodiments illustrated in FIGS. 2–6, it is preferred that means for providing rotatable support 150 comprise two bearings 152. Referring to FIGS. 2–5, it is believed to be preferred that bearings 152 be thrust bearings in order to support the axial loads transmitted through shaft 114 when damper apparatus 100 is used in applications such as vehicular shock absorbers or stability control devices.

Referring generally to FIGS. 2–7, damping mechanism 104 utilizes a coaxial rotary configuration for generating a resistance or damping force rather than prior piston-based configurations. Damping mechanism 104 generally comprises hub 154 that is fixed to shaft 114, means for generating 156 a variable electromagnetic field 158 in response to an input signal that is representative of a desired damping force, fluid 160 having a viscosity that may be continuously varied by application of electromagnetic field 158 that is in touching contact with the hub, and damper housing 162, wherein application of variable electromagnetic field 158 to fluid 160 produces changes in the viscosity of fluid 160 that in turn provides variable resistance to rotation of hub 154 through fluid 160 and translation of translatable member 106.

Referring again to FIGS. 2–7, damping mechanism 104 may also be described generally as comprising a damper housing 162 having a first end 164 with bore 166 that is adapted to rotatably receive shaft 114 therethrough. Bore 166 is preferably also adapted to receive means for providing rotatable support 150. Damper housing 162 also comprises sidewall 168 having cylindrical inner surface 170 and second end 172. Damping mechanism 104 also comprises hub 154 that is fixed to shaft 114 and housed within cylindrical inner surface 170 of damper housing 162. Hub 154 has an outer surface 174 that is proximate a portion of inner surface 170 of sidewall 168 such that outer surface 174 of hub 154 and sidewall 168 of damper housing 162 define at least a portion of channel 176 between them. Other elements may also serve to define channel 176, as described below. Channel 176 comprises the space between the rotatable elements, such as hub 154, and the non-rotatable elements, such as damper housing 162. Damping mechanism 104 also comprises means for generating 156 electromagnetic field 158 within channel 176, and fluid 160 which is located within channel 176 and has a viscosity that can be varied by application of electromagnetic field 158.

Referring to FIGS. 2–7, damping mechanism 104 may comprise a number of alternate configurations, hub 154 and channel 176 may comprise a number of different shapes and sizes. As shown in FIGS. 2–7, hub 154 is generally cylindrical and comprises a magnetic portion 178 and may optionally, depending on the shape of channel 176 and placement of fluid 160, comprise a non-magnetic portion 180. These configurations of damping mechanism 104 are described in greater detail below.

Figure 3:
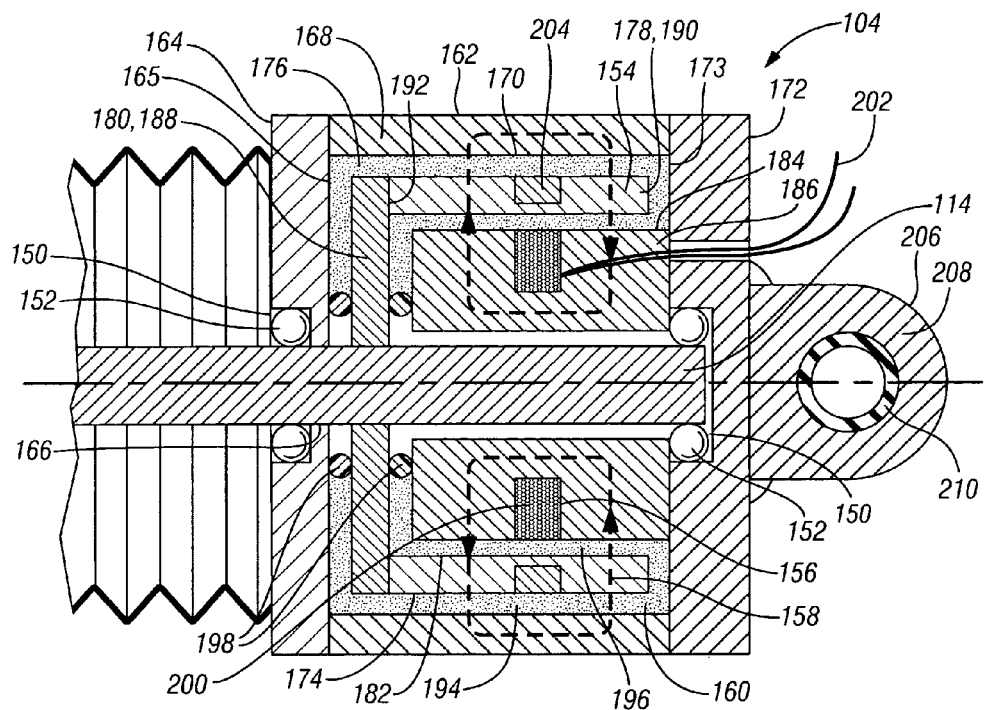
FIG. 3 is an enlarged schematic cross-sectional illustration of the damping mechanism of the MR fluid damper of FIG. 2.

Referring to FIGS. 2–3, a first embodiment of damping mechanism 104 is illustrated wherein hub 154 generally has the shape of a cylindrical cup that is fixed to shaft 114. In this embodiment, channel 176 has the shape of a pair of concentric cylindrical cups of different diameter which are joined by a lateral section at their rims. Channel 176 is defined and bounded generally by a portion of inner surface 170 of sidewall 168, inner surface 165 of first end 164 and outer surface 174 of hub 154; inner surface 182 of hub 154 and outer surface 184 of cylindrical core 186; and inner surface 173 of second end 172. Hub 154 preferably comprises cylindrical base 188 that is fixed to shaft 114 using known joining methods, such as an interference fit, welding, brazing, staking or other methods, and cylindrical wall 190 which extends outwardly from cylindrical base 188. Cylindrical base 188 preferably comprises a non-magnetic material, such as austenitic steel, aluminum or other non-magnetic material. Cylindrical wall 190 comprises a magnetic material, such as magnetic steel. Cylindrical wall 190 is fixed to cylindrical base 188 at outer rim 192 using joining methods such as are used to join base 188 to shaft 114. Outer surface of hub 154 is located proximate cylindrical inner surface 170 of sidewall 168 in spaced adjacency, such that a first portion 194 of channel 176 is formed thereby. Cylindrical core 186 is fixed to second end 172 of damper housing 162 and is sized and located proximate inner surface 182 of hub 154 in spaced adjacency such that a second portion 196 of channel 176 is formed thereby. Core 186 comprises a magnetic metal, such as magnetic steel and is attached to second end 172 of damper housing 162. Channel 176 is further defined by a pair of seals 198, one of which is preferably located between inner surface 165 of first end 164 and outer surface 174 of hub 154, and the other of which is located between inner surface 182 of hub 154 and outer surface 184 of core 186 in order to retain fluid 160 within channel 176. Fluid 160 is preferably an MR fluid, as described herein. When an MR fluid is used, damping mechanism 104 also comprises coil 200 having a plurality of windings and which may also incorporate a magnetic core in order to enhance the strength of electromagnetic field 158, which in this embodiment of the invention is a magnetic field 158. Coil 200 may be located in a recess that is formed in core 186. Coil 200 is attached to an electrical connection 202 such that an electrical current can be communicated to it in order to energize coil 200 and produce magnetic field 158. The strength of magnetic field 158 is proportional to the applied current and may be automatically controlled by varying the current, which in turn controls the viscosity of MR fluid 160 and the resistance to rotation of hub 154. Cylindrical wall 190 also preferably incorporates a non-magnetic ring 204 opposite coil 200 which is used to shape magnetic field 158 so that its lines of magnetic flux are substantially perpendicular to channel 176 in both first portion 194 and second portion 196. Non-magnetic ring may comprise any non-magnetic material, including non-magnetic metals and plastics. Non-magnetic ring 204 may extend through the entire thickness of cylindrical wall 190 or be inserted into a groove that extends substantially through the thickness of it. Damping mechanism 104 also preferably comprises attachment point 206, such as flange 208 and elastomeric bushing 210, or alternately a threaded end (not shown), for fixing the damping mechanism 104 of damping apparatus 100 to one of the items which is to be damped, such as, in the case of a vehicle, the vehicle chassis or other "sprung" masses or the axle, wheel or other unsprung masses.

In operation, when there is zero current through coil 200, hub 154 provides minimum resistance to linear motion of the device, which resistance depends on the actuator geometry, the MR fluid viscosity, the pitch or lead and internal resistances of ball nut 116/ball screw 146 and other factors. If a current is injected into coil 200 from an external current driver (not shown), magnetic field 158 is generated in the MR fluid and thereby increases the resistance to rotation of hub 154 by increasing the viscosity of fluid 160 and yield stress to be overcome for hub 154 to rotate through fluid 160, which in turn translates to an increased force of resistance to the linear translation of damping apparatus 100. By controlling the current injected into coil 200, the resistance or damping force can be controlled. Thus, the combined linear to rotary conversion mechanism and damping mechanism work together as a controllable resistance device or damper with respect to the system to which it is attached at attachment points 140, 206, such a vehicular suspension system.

Figure 4:
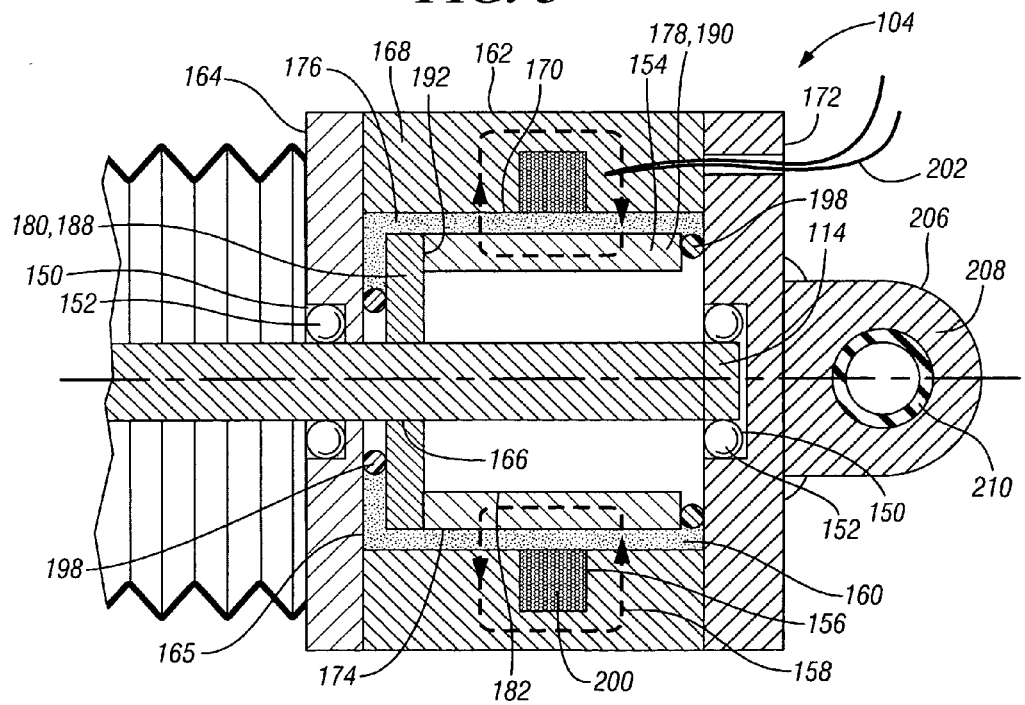
FIG. 4 is a schematic cross-sectional illustration of a second embodiment of a damping mechanism of an MR fluid damper of the present invention.

Referring to FIG. 4, a second embodiment of damping mechanism 104 is illustrated, wherein hub 154 generally has the shape, features and construction of cylindrical cup-shaped hub 154 described above with regard to FIGS. 2–3. Outer surface 174 of hub 154 is located proximate inner surface 170 of sidewall 168 and inner surface 165 of first end 164 in spaced adjacency, such that channel 176 is formed thereby. Channel 176 is further defined by a pair of seals 198 that are located between inner surface 165 of first end 164 and outer surface 174 of hub 154 in order to retain fluid 160 within channel 176. Fluid 160 is preferably an MR fluid. When an MR fluid 160 is used, damping mechanism 104 also comprises coil 200 which in turn comprises a plurality of wire windings and may also incorporate a magnetic core in order to enhance the strength of magnetic fields 158 that may be produced by coil 200. Coil 200 may be attached and operated as described above with regard to the apparatus of FIGS. 2–3. Damping mechanism 104 also preferably comprises attachment point 206 as described above with regard to the apparatus of FIGS. 2–3.

Figure 5:
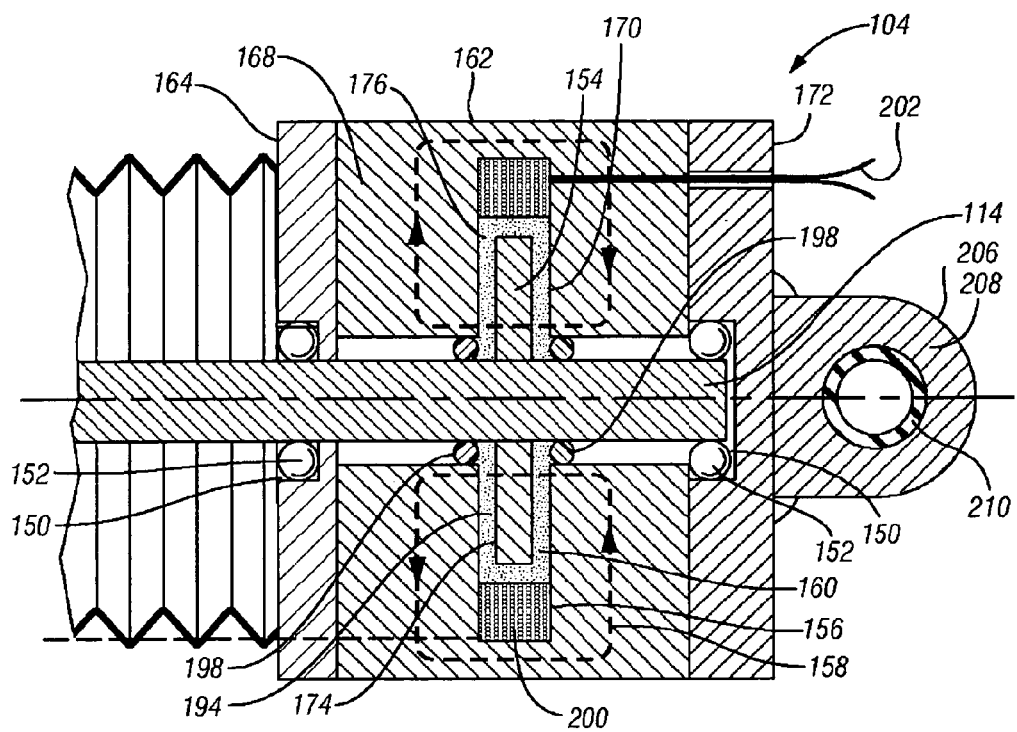
FIG. 5 is a schematic cross-sectional illustration of a third embodiment of a damping mechanism of an MR fluid damper of the present invention.

Referring to FIG. 5, a third embodiment of damping mechanism 104 is illustrated, wherein hub 154 generally has the shape of a cylindrical disk that is fixed to shaft 114. In this embodiment, channel 176 also generally has the shape of a cylinder which is defined generally by outer surface 174 of hub 154 and a cylindrical portion of inner surface 170 of sidewall 168. Hub 154 preferably comprises a cylindrical disk that is fixed to shaft 114 using methods such as those described above with regard to FIGS. 2–3. Hub 154 comprises a magnetic material, such as magnetic steel. Outer surface 174 of hub 154 is located proximate a cylindrical portion of inner surface 170 of sidewall 168 in spaced adjacency, such that channel 176 is formed thereby. Channel 176 is further defined by a pair of seals 198 that are located between inner surface 170 of sidewall 168 and outer surface 174 of hub 154 in order to retain fluid 160 within channel. When an MR fluid 160 is used, damping mechanism 104 also comprises coil 200 which in turn comprises a plurality of wire windings and may also incorporate a magnetic core in order to enhance the strength of magnetic fields that may be produced by coil 200. Coil 200 may be attached and operated as described above with regard to the apparatus of FIGS. 2–4. Damping mechanism 104 also preferably comprises attachment point as described above with regard to the apparatus of FIGS. 2–4.

Referring to FIG. 6, damping mechanism 104 is generally identical to that illustrated in FIG. 4 and described herein, except that it is employed in conjunction with a linear to rotary conversion mechanism 102 comprising rack 138 and pinion 148.

Referring again to FIGS. 2–6, it is believed that the seals 198 used to define channel 176 may also be combined with means for providing rotatable support 150, such as bearings or bushings, by the use of sealed bearings or bushings and by placing them so as to also define channel 176. In such cases, it may be desirable to alter the shape of channel 176 such as by eliminating seals 198, such that fluid 160 occupies more of the internal volume of damper housing. While offering somewhat simpler construction, such modifications may in turn require the use of a greater volume of fluid 160.

Fluid 160 may comprise any fluid having a viscosity that may be varied by application of an electromagnetic field. Fluid is preferably a MR fluid or an electrorheological (ER) fluid, and most preferably a magnetorheological fluid. Electrorheological (ER) fluids are suspensions consisting of extremely fine dielectric particles of sizes ranging from about 0.1–100 μm in a non-conducting fluid base. The apparent viscosity of these fluids changes reversibly in response to an electric field. For instance, a typical ER fluid can go from the consistency of a liquid to that of a gel, and back, with response times on the order of milliseconds. The change in viscosity is proportional to the applied potential and the properties of the dielectric base fluid. Since the dielectric constant of suspensions particles is larger than the dielectric constant of the base fluid, application of an external electric field polarizes particles. Polarized particles interact and form chain-like or even lattice-like organized structures. Simultaneously, the rheological properties of the suspension change and the viscosity of the fluid increases. Referring to FIGS. 2–7, it is believed that ER fluids may also be used in these devices with the following modifications as exemplified in FIG. 8. The coils shown in these FIGS. 2–7 should be replaced by a pair of electrodes 157A and 157B that are placed on opposite sides of channel 176. Electrodes should be attached to a variable voltage source that is adapted to energize electrodes and generate a variable electric field 159 within channel 176. In the embodiments shown, the first electrode 157A may be substituted for coil 200. The second electrode 157B should be placed opposite the first electrode and across channel 176 and may be incorporated into either of sidewall 170 or hub 154, depending on the configuration of first electrode.

Fluid 160 is preferably an MR fluid. Various MR fluids and the design considerations associated with the development of a magnetic field in a narrow channel are described in U.S. Pat. No. 5,667,715, which is hereby incorporated by reference in its entirety. For an MR fluid which utilizes iron particles in a carrier fluid base, such as mineral oil or synthetic oil, having a viscosity of about 50–5000 cP and a density of about 2–5 g/cm$^3$ at 40° C., it is also believed that iron particles having a diameter in the range of about 100 nm-80 μm in a concentration of about 0.15–0.6 volume fraction is preferred.

For a damping apparatus of the design illustrated in FIGS. 2–3, where the length of cylindrical wall 190 of hub 154 is about 20 mm and the radius of hub 154 at its outer surface 174 is about 21 mm and the thickness of cylindrical wall 174 is about 1 mm, and the width of channel 176 is about 0.5 mm, the volume of MR fluid required is about 2.6 cc which is about one to two orders of magnitude lower than the quantity of MR fluid used in prior piston-based configurations. This is a significant advantage of damping apparatus 100 as compared with existing MR fluid based dampers, such as piston-based MR dampers, because of the reduction in manufacturing cost associated with a one to two order of magnitude reduction in the volume of MR fluid utilized. Utilizing a coil having dimensions of about 5.6 mm wide by 8.6 mm high with about 153 turns of 26 AWG copper conductor energized with a current of about 2.5 A, it is believed that such a damping apparatus 100 is capable of developing a magnetic field of about 0.8 Tesla in the channel and a torque lockup resistance force of about 3–5 N-m, which translates to a force on the translating member of about 1600–2700 N at 1 m/sec velocity with a ball screw having a lead of about 12.7 mm/revolution. Another significant advantage of apparatus 100 as compared with existing MR fluid based dampers, such as piston-based MR dampers, is believed to be that damping apparatus 100 can be packaged in a smaller packaging or volume envelope. This reduction in packaging volume is related to both the reduced volume of MR fluid required for its operation and the elimination of the need for a gas reservoir to accommodate fluid displacement as the damper is actuated, as illustrated in FIG. 1. Yet another advantage of damping apparatus 100 is believed to be that the packaging and size of coil 200 is less constrained as compared to prior piston-based dampers wherein the coil was located in the piston, because the size of the coil was limited by the size and shape of the piston. This is also believed to offer the possibility of developing higher turn-up ratios based on the use of larger coils in the same or smaller package designs as compared to prior piston-based MR fluid dampers. Damping apparatus 100 is also believed to provide improved linearity of the force-velocity response characteristics as compared to prior piston-based MR fluid dampers due to the absence of second order entry and exit effects associated with MR fluid flow through the orifices found in these devices.

The current required to energize coil 200 may be supplied by an external current source such as a battery or an alternator. The control of the current source, including the magnitude of the current, switching and other control functions, may be done through a power control module. The power control module may receive an input signal that is representative of the desired damping force from one or more real time control modules which control the vehicle, such as those that control the brakes, suspension, or other aspects of vehicle dynamics. The power control module may be incorporated into such control modules, or as a separate control module. When damping apparatus 100 is combined with the systems mentioned it can be used as a semi-active damping apparatus for suspension damping, roll control or the control of other aspects of vehicle dynamics.

In existing MR fluid based dampers, such as piston-based MR dampers, the component surfaces, such as the piston and damper tube, that are in contact with the MR fluid are frequently coated with an anti-wear coating because of the abrasive nature of the MR fluid. With regard to damping apparatus 100, it may also be desirable to coat one or more of the surfaces of components which are in contact with fluid 160, such as surfaces 165, 170, 171, 173, 174, 182, and 184, with an anti-wear coating of a type well known in the art, such as a hard chrome coating. Another advantage of damping apparatus 100 is believed to be a reduction in the surface area of components in the damping mechanism 104 that require anti-wear coatings due to the abrasive nature of the MR fluids, and an associated reduction in manufacturing costs associated with the application of these coatings.

It will be apparent to those skilled in the art, that although the invention has been described in terms of specific and preferred embodiments and examples, modifications and changes may be made to the disclosed embodiments without departing from the essence of the invention. Words used herein are words of description rather than of limitation. It is, therefore, to be understood, that the appended claims are intended to cover all modifications which naturally flow from the foregoing description and examples.

The invention claimed is:

1. An apparatus operable to provide damping between a sprung mass and an unsprung mass, comprising:
    a translatable member having a first attachment point, and adapted for generally linear translation in a forward and a reverse direction;
    a rotatable member comprising a rotatable shaft that is rotatably coupled to the translatable member; wherein translation of the translatable member in one of the forward or the reverse directions produces a forward or a reverse rotation of the rotatable member and shaft, respectively;
    a damping mechanism comprising a housing having a second attachment point, a first end with a bore that is adapted to rotatably receive the shaft therethrough, a sidewall having an inner surface and a second end, a hub having an outer surface that is fixed to the shaft and located within the inner surface of the sidewall such that the hub and sidewall form a channel therebetween, a means for generating a single electromagnetic field within the channel, and a fluid located within the channel having a viscosity that can be varied by the application of the electromagnetic field;
    wherein the fluid is a magnetorheological fluid;
    wherein the means for applying the single electromagnetic field within the channel is a coil that is located proximate the channel;
    wherein the hub comprises a cylindrical base having an outer rim and that is fixed to the shaft and a cylindrical wall extending from the outer rim and located adjacent to the inner surface of the sidewall of the housing, wherein a first portion between the sidewall of the housing and the cylindrical wall of the hub comprises the channel; and,
    a cylindrical core attached to the second end of the housing and extending along and adjacent to the cylindrical wall of the hub, wherein a second portion between the cylindrical wall of the hub and the cylindrical core further comprises the channel;
    wherein the core has a recess in an outer surface and the coil is located within the recess.

2. The damping apparatus of claim 1, wherein the translatable member comprises a ball nut and the rotatable member comprises a ball screw.

3. The damping apparatus of claim 1, wherein the cylindrical base of the hub comprises a non-magnetic material and the cylindrical wall of the hub and the cylindrical core comprise a magnetic material.

4. The apparatus of claim 1, wherein the sprung mass comprises a vehicle chassis.

5. The apparatus of claim 1, wherein the unsprung mass comprises a vehicle wheel.

6. The apparatus of claim 5, wherein the unsprung mass further comprises a vehicle axle.

\* \* \* \* \*